United States Patent
Le (10) Patent No.: US 12,505,341 B2
(45) Date of Patent: Dec. 23, 2025

(54) METHODS AND SYSTEMS FOR DYNAMICALLY SELECTING ALTERNATIVE CONTENT BASED ON REAL-TIME EVENTS DURING DEVICE SESSIONS USING CROSS-CHANNEL, TIME-BOUND DEEP REINFORCEMENT MACHINE LEARNING

(71) Applicant: Capital One Services, LLC, McLean, VA (US)

(72) Inventor: Minh Le, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1127 days.

(21) Appl. No.: 17/142,896

(22) Filed: Jan. 6, 2021

(65) Prior Publication Data

US 2022/0215244 A1 Jul. 7, 2022

(51) Int. Cl.
*G06N 3/08* (2023.01)
*G06N 3/04* (2023.01)
*G06N 5/04* (2023.01)
*G06N 20/00* (2019.01)

(52) U.S. Cl.
CPC ............... *G06N 3/08* (2013.01); *G06N 3/04* (2013.01); *G06N 5/04* (2013.01); *G06N 20/00* (2019.01)

(58) Field of Classification Search
CPC ............ G06N 20/00; G06N 5/04; G06N 3/04; G06N 3/08; G06N 3/092
See application file for complete search history.

(56) References Cited

U.S. PATENT DOCUMENTS

| 10,795,900 B1 * | 10/2020 | Satuluri ............... G06F 16/907 |
| 10,868,888 B1 | 12/2020 | Govan et al. |
| 2016/0004970 A1 * | 1/2016 | Lu ............................. G06N 5/04 706/12 |

(Continued)

FOREIGN PATENT DOCUMENTS

| CN | 111897861 A | 11/2020 |
| WO | 2020005671 A1 | 1/2020 |

OTHER PUBLICATIONS

Bai et al., "Model-Based Reinforcement Learning with Adversarial Training for Online Recommendation," 2020, arXiv:1911.03845v3. (Year: 2020).*

(Continued)

*Primary Examiner* — Michael J Huntley
*Assistant Examiner* — Vincent Anton Spraul
(74) *Attorney, Agent, or Firm* — Foley & Lardner LLP (57) ABSTRACT

Methods and systems are described herein for dynamically selecting alternative content based on real-time events during device sessions using a cross-channel, time-bound deep reinforcement machine learning. The use of this architecture allows for alternative content to be selected in a time-bound and continuous manner that provides predictions in a dynamic environment (e.g., an environment in which user data is continuously changing and new events are continuously occurring) and with an increased success rate (e.g., new data and events are factored into each prediction). For example, in the system each round of predictions considers both input features, which can change by a user's actions, state of a user interface, and/or previous responses and states.

20 Claims, 6 Drawing Sheets

(56) References Cited

U.S. PATENT DOCUMENTS

| | | | |
|---|---|---|---|
| 2016/0379123 A1* | 12/2016 | Younessian | G06Q 50/01 |
| | | | 706/52 |
| 2019/0295004 A1* | 9/2019 | Chaturapruek | G06F 18/214 |
| 2020/0118145 A1* | 4/2020 | Jain | G06Q 30/02 |
| 2020/0204862 A1 | 6/2020 | Miller | |
| 2020/0257968 A1* | 8/2020 | Mitra | G06F 9/4881 |
| 2021/0004421 A1* | 1/2021 | Zadorojniy | G06F 18/2185 |
| 2021/0142387 A1* | 5/2021 | Gupta | G06Q 30/0217 |
| 2022/0205798 A1* | 6/2022 | Rivella | H04N 21/251 |
| 2022/0207093 A1* | 6/2022 | Badr | G06F 16/9535 |

OTHER PUBLICATIONS

Jiang, "MicroRec: Accelerating Deep Recommendation Systems to Microseconds by Hardware and Data Structure Solutions," 2020, arXiv:2010.05894v1 (Year: 2020).*
Wang et al., "Recommendation System with Reinforcement Learning," Harvard Data Science Capstone Project, Fall 2019, towardsdatascience.com/recommendation-system-with-reinforcement-learning-3362cb4422c8 (Year: 2019).*
Ha et al., "World Models," 2018, arXiv:1803.10122v4 (Year: 2018).*
International Search Report and Written Opinion issued in corresponding International Application No. PCT/US2021/063101 on Apr. 14, 2022 (9 pages).

\* cited by examiner

METHODS AND SYSTEMS FOR DYNAMICALLY SELECTING ALTERNATIVE CONTENT BASED ON REAL-TIME EVENTS DURING DEVICE SESSIONS USING CROSS-CHANNEL, TIME-BOUND DEEP REINFORCEMENT MACHINE LEARNING

FIELD OF THE INVENTION

The invention relates to dynamically selecting alternative content based on real-time events during device sessions using a cross-channel, time-bound deep reinforcement machine learning.

BACKGROUND

In recent years, users are increasingly receiving content on numerous different platforms. Moreover, users are increasingly accessing this content through different channels. However, these increases in both available content and its accessibility creates issues for generating personalized content for users.

SUMMARY

Methods and systems are described herein for generating personalized content. For example, users increasingly steer themselves towards more personalized content and content providers are increasingly attempting to personalize content for users. Conventional methods of generating personalized content have relied on tracking users and then providing one preselected piece of content from a plurality of preselected pieces of content. For example, conventional menu interfaces (e.g., user interfaces of a web browser) are static during device sessions. To the extent that these interfaces are not static, they may have rolling banner adds, pop-ups, or other rotating content. These types of content, which are also known as "image carousels" or "sliders," allow for a static menu to appear dynamic. Additionally, these image carousels, which may rotate automatically or upon a user selection, allow a user to view multiple banner messages without navigating away from a menu, webpage, and/or another instance of a menu interface.

However, because the order of this image carousel and the content in each image is set upon a user beginning a device session (e.g., by accessing an interface, landing on a webpage, opening a mobile application, etc.), these conventional systems cannot provide dynamic and customized content based on feedback and/or additional data received during the device session. That is, the order and/or content of the image carousel is determined once when a user is accessing an interface, but is not able to be dynamically updated afterwards (e.g., based on user actions (or inactions), subsequently received user data (e.g., from another source), and/or other real-time data) during the device session despite the system receiving additional user inputs and/or data. On a practical level, with respect to user interface applications, this means that a user is less likely to be engaged and valuable screen real estate is wasted.

Accordingly, methods and systems are described herein for dynamically selecting alternative content based on real-time events during device sessions. To dynamically select alternative content based on real-time events during device sessions, the system must overcome several technical hurdles. First, the system must be able to dynamically select alternative content quickly (e.g., in order to prevent loading delays and present the alternative content in response to a normal cadence of the user device session) and accurately (e.g., based on one or more goals of the content provider when providing alternative content).

With respect to selecting alternative content quickly, conventional approaches (e.g., active and/or passive user profiling based on responses to detected triggers with a correlated action) may not provide benefits beyond conventional static systems (e.g., systems that select content or a series of content prior to the device session) because the conventional approaches cannot process incoming data quickly enough to dynamically select data. For example, the system may receive multiple events during a time interval between a dynamic update. These events may comprise user actions (or inactions), user data (e.g., related to tangential user accounts), data receiving from third-party sources (e.g., real-time sports scores, stock market information, etc.), temporal/geographical information (e.g., current time and/or location data of a user). As the number of events (and data based on those events) increases, and users routinely access content (and data becomes available from different devices), the use of conventional user profiling techniques becomes untenable because the systems cannot interpret a meaning of the plethora of data and distinguish between the multiple types of data quickly enough.

To overcome this technical problem, the methods and systems use a machine learning model to dynamically select alternative content based on real-time events during device sessions. However, while machine learning models may be effective in quickly and accurately identifying patterns and providing responses, conventional machine learning models run afoul of the other requirement for dynamically selecting alternative content (i.e., accurately selecting content based on one or more goals of the content provider when providing alternative content).

For example, while machine learning models are able to quickly interpret data and provide responses in real-time or near real-time (e.g., content corresponding to a determined intent of the user based on received events) for an initial set of categories (e.g., potential intents of a user), the machine learning model must be trained to identify that a user has each of those intents. This training process may involve copious amounts of training data (e.g., sets of user data that is labeled with known intents) and numerous mathematical iterations as the machine learning model learns how to categorize inputted user data into the labeled intents. Furthermore, in instances involving unsupervised learning, the content provider may not know what criteria is used, or how a determination is made, by the machine learning model.

To further complicate these technical issues, the machine learning model may have multiple goals (e.g., predicting a current intent of a user, predicting a need of the user that may be unknown to the user, predicting a mental state of the user, etc.). Each of these goals may require different (or separate training of machine learning models), may require different data, may require different preprocessing of data, and/or may require categories for prediction to be updated at different rates and with different categories. Additionally, one or more of the goals may conflict with each other and/or the system may need to determine whether or not to present a prediction related to one goal as opposed to another.

Accordingly, to overcome these technical problems with respect to conventional machine learning models, methods and systems are described herein for dynamically selecting alternative content based on real-time events during device sessions through the use of a cross-channel, time-bound deep reinforcement machine learning. The use of this architecture allows for alternative content to be selected in a time-bound and continuous manner that provides predictions in a dynamic environment (e.g., an environment in which user data is continuously changing and new events are continuously occurring) and with an increased success rate (e.g., new data and events are factored into each prediction). For example, in the system each round of predictions considers both input features, which can change by a user's actions, state of a user interface, and/or previous responses and states. Similarly, as the system is time-bound, predictions based on timeouts (e.g., a lack of user actions, additional data, events occurring, and/or state changes) are considered (e.g., indicating a rejection), for which the system decreases a likelihood of success of previously presented content.

Additionally, in order to accommodate multiple goals without sacrificing accuracy, the methods and systems optimize cross-channel predictions by incorporating the user feedback and real-time events. For example, optimizing cross-channel predictions allows for the system to detect, and make predictions on, inter-dependencies of models having multiple goals. For example, a first and second machine learning model may have different goals and may need to be trained and updated separately. For example, labeled data for training a first machine learning model (e.g., used to determine users' new behavior in response to a given content) may not be available for new products (which continuously emerge), the marketing of which, may be the goal of the first machine learning model. In contrast, labeled data for training a second machine learning model (e.g., used to disambiguate a user's existing needs) may be known and unchanging (or changing at a different rate and therefore requiring less updating).

Additionally, the system may also be built on a Deep Deterministic Policy Gradient ("DDPG") architecture. This architecture estimates, for a given state "s," the probability distribution over actions "a". The system may then determine the best alternative content by determining the largest expected path-discounted total returned value. To fairly represent the needs of multiple goals, the system may select a stochastic policy over max-Q alternative architecture. For example, the system may train an agent to complete a task within this environment by receiving observations and returned values and sending actions to the environment. For example, the system may comprise a reinforcement learning agent, wherein the reinforcement learning agent is trained to generate policy parameters, based on actions, observations, and returned values, which maximize the returned values in an environment, and wherein the environment is based on outputs from a first machine learning model, wherein the first machine learning model is trained to determine users' behavior in response to given content and outputs from a second machine learning model, wherein the second machine learning model is trained to disambiguate users' existing needs to select content. For example, "actions" may be the agent's prediction of the best task (e.g., content) to present. For each action, the agent may collect an algorithmically determined returned value via returned value function. The actions and returned values may comprise streaming data combining the outputs of multiple machine learning models. This combination allows the cross-channel interaction learning, even though the multiple machine learning model may have different algorithms, architecture, training data, and/or goals.

In some aspects, methods and systems for dynamically selecting alternative content based on real-time events during device sessions through the use of a cross-channel, time-bound deep reinforcement machine learning are described. For example, the system may receive initial user data in response to a user initiating a device session, wherein the device session comprises a plurality of time intervals. The system may generate a first feature input for a first machine learning model and a second machine learning model based on the initial user data, wherein the first machine learning model is trained to determine users' behavior in response to given content, and wherein the second machine learning model is trained to disambiguate users' existing needs to select content. The system may receive a first set of content from the first machine learning model and the second machine learning model based on the first feature input. The system may determine, based on policy parameters, first content of the first set of content to generate for display in a user interface during a first time interval of the plurality of time intervals, wherein the policy parameters are determined by a reinforcement learning agent based on actions, observations, and returned values, which maximize the returned values in an environment, and wherein the environment is based on outputs from the first machine learning model and outputs from the second machine learning model. The system may generate for display, in the user interface the first content during the first time interval.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

Figure 1:
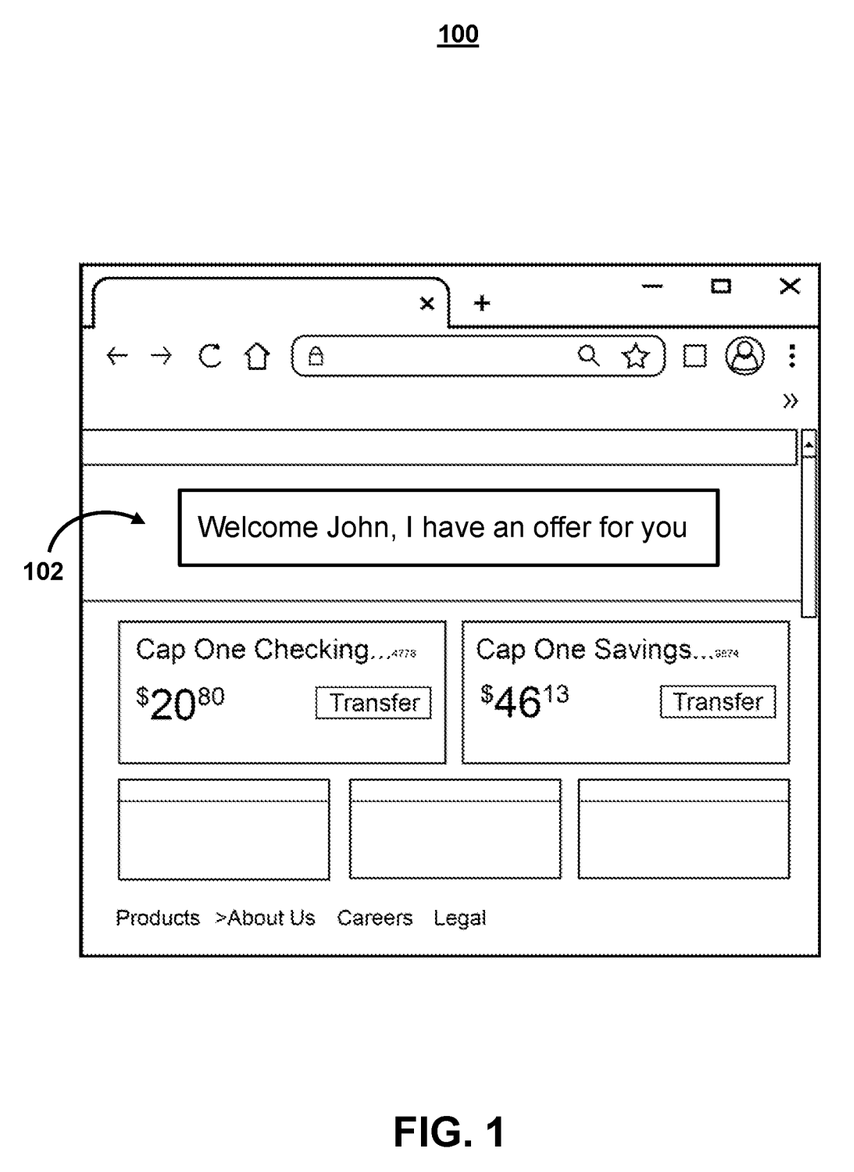
FIG. 1 shows an illustrative user interface for dynamically selecting alternative content based on real-time events during device sessions through the use of a cross-channel, time-bound deep reinforcement machine learning, in accordance with one or more embodiments.

FIG. 1 shows an illustrative user interface for presenting dynamically selected alternative content based on real-time events during device sessions using a cross-channel, time-bound deep reinforcement machine learning, in accordance with one or more embodiments. For example, user interface 100 may present alternative content based on dynamic and customized suggestions from a machine learning model. The alternative content may appear in section 102, which may comprise a small click window dialog box separated from the rest of the content present in user interface 100.

For example, FIG. 1 shows a user interface (e.g., of a web browser) in which original content (e.g., content published in its native form by a content provider and/or select based on initial user data) is replaced with alternative content (e.g., content published after additional user data is received). For example, user interface 100 may comprise content received for display, in a user interface of a web browser on a user device, to a user.

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

In some embodiments, alternative content may be personalized for a user based on the original content and user data (e.g., as stored in a user profile). A user profile may be a directory of stored user settings, preferences, and information for the related user account. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

FIG. 1 shows user interface 100. User interface 100 includes content having a plurality of sections. As referred to herein, a "section" may comprise any of the more or less distinct parts into which something the content may be divided or from which the content is made up. For example, a section may be distinguished from another section by one or more section characteristics. In user interface 100, the system may identify a section of the plurality of sections as having a section characteristic. For example, a section may correspond to a section (e.g., section 102) reserved for alternative content (and/or content being dynamically updated).

A section characteristic may comprise any characteristic that distinguishes one section from another. For example, a section characteristic may be media-related information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, user interface 100 may include section 102. The system may identify section 102 based on a paragraph, section break, and/or an HTML tag. The system may parse the section for a content characteristic (e.g., content characteristic) and metadata describing the content characteristic, wherein the metadata indicates a context of the content characteristic, and wherein the content characteristic comprises human-readable text.

The system may then generate a feature input based on user data and a current state of user interface 100, wherein the feature input comprises a vector array of values indicative of the received user data (including updates based on received events) and the state of user interface 100. For example, the system may use a machine learning model to replace content in section 102 with alternative content. The state of the user interface may correspond to a state of stateful design, wherein the system records preceding events or user interactions. The recorded information up to the current point may comprise the state of the system. The set of states a system may occupy may correspond to its state space.

As referred to herein, the state may comprise a series of events. An event may be an action or occurrence recognized by software, often originating asynchronously from the external environment, that may be handled by the software. In some embodiments, events may be generated or triggered by the system, by the user, or in other ways (e.g., based on external circumstances, time triggers, etc.).

User interface 100 may also present content generated for display during a device session. As referred to herein, a device session may include a period of time, wherein a user interacts with an application, platform, and/or device. A device session may begin when a user opens an application, powers on a device, and/or lands at a website, during the session, the system may record the length and frequency of the session as well as any events occurring during the session. It should be noted that some sessions may be non-contiguous and may include time while an application was running in the background, may be switching devices, platform, applications, and/or environments. For example, a user may switch from browsing in a mobile application to browsing in a website during a single session.

Figure 2:
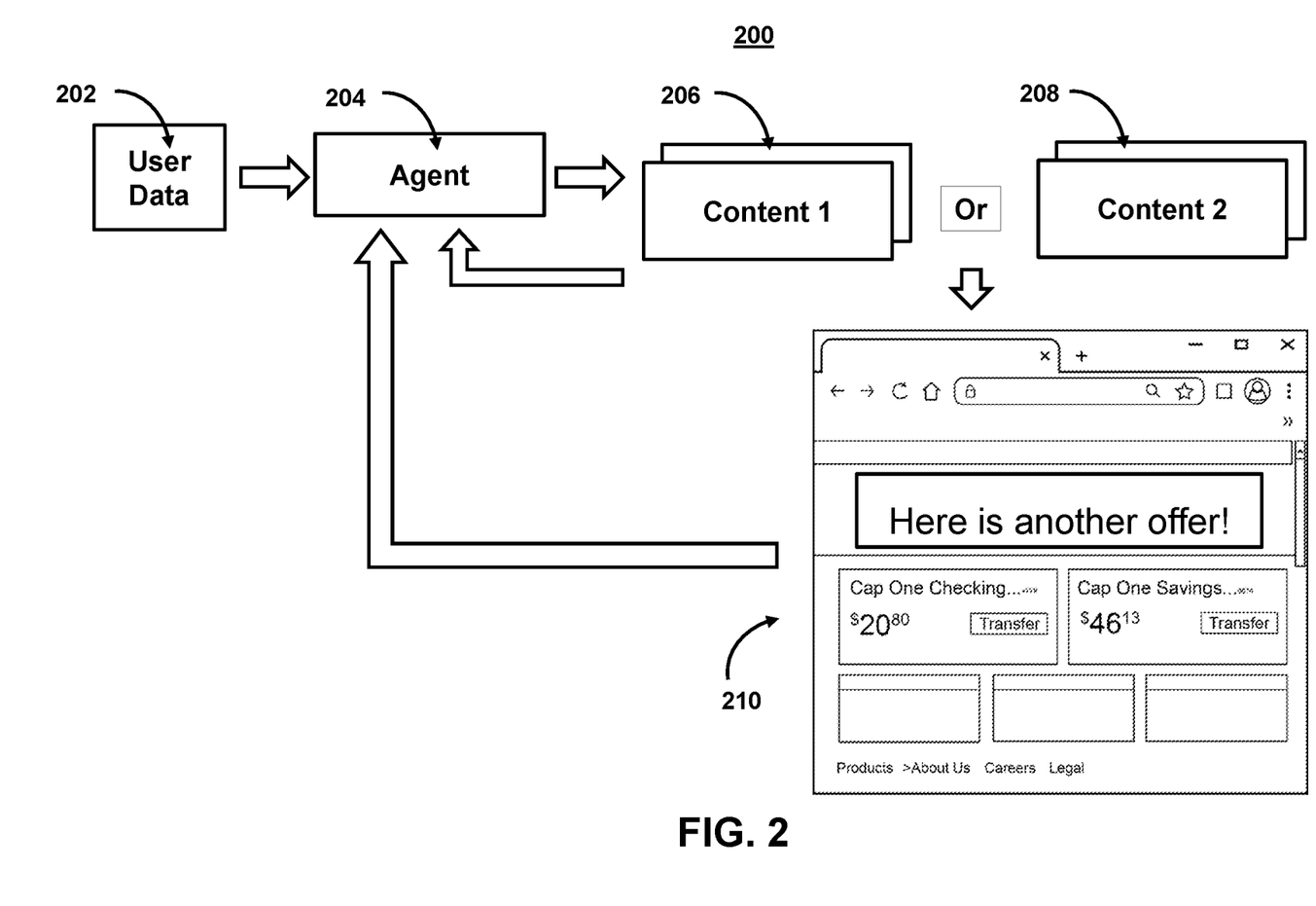
FIG. 2 shows an illustrative system diagram for dynamically selecting alternative content based on real-time events during device sessions through the use of a cross-channel, time-bound deep reinforcement machine learning, in accordance with one or more embodiments.

FIG. 2 shows an illustrative system diagram for dynamically selecting alternative content based on real-time events during device sessions through the use of a cross-channel, time-bound deep reinforcement machine learning, in accordance with one or more embodiments. For example, system 200 may include user data 202. User data 202 may include data retrieved by the system upon beginning a device session. This may include user account information, clickstream data, transaction records, other third-party inbound events). At agent 204, the system selects initial content for display in user interface 210. For example, the system may select content 206 or content 208. To select between content 206 and content 208, the system may use user-specific data (e.g., user data 202) and receive an output from agent 204. System 200 may then generate user interface 210 with the selected content.

The content that is selected is then fed back into agent 204 as well as any subsequent event occurring in user interface 210 (e.g., a user selecting or not selecting the displayed content). Agent 204 therefore receives both the result of the initial selection (e.g., whether content 206 or content 208 was selected) as well as a result of the display of the selected content (e.g., an event that occurred after presenting the content in user interface 210). System 200 generates a feature input for agent 204 to update its predictions (e.g., predict alternative content for displaying in user interface 210) following a predetermined time interval and/or after a triggering event. System 200 continues with this cycle to generate continuous predictions.

For example, agent 204 may be a reinforcement learning agent which receives observations and a returned value from the environment. Using its policy, the agent selects an action based on the observations and returned value and sends the action to the environment. During training, the agent may continuously update the policy parameters based on the action, observations, and returned value. Doing so allows the agent to learn the optimal policy for the given environment and returned value signal. As explained in FIG. 5 below, the goal of reinforcement learning is to train an agent to complete a task within an uncertain environment. The agent receives observations and a returned value from the environment and sends actions to the environment. The returned value is a measure of how successful an action is with respect to completing the task goal. The agent contains two components: a policy and a learning algorithm. The policy is a mapping that selects actions based on the observations from the environment. Typically, the policy is a function approximator with tunable parameters, such as a deep neural network. The learning algorithm may continuously update the policy parameters based on the actions, observations, and returned values. The goal of the learning algorithm may be to find an optimal policy that maximizes the expected cumulative long-term returned value received during the task.

For example, agent 204 may comprise a trained reinforcement learning agent, wherein the reinforcement learning agent is trained to generate policy parameters, based on actions, observations, and returned values, which maximize the returned values in an environment. The environment may be is based on outputs from a first machine learning model. Additionally or alternatively, the the first machine learning model may be trained to determine users' behavior in response to given content and outputs from a second machine learning model, wherein the second machine learning model is trained to disambiguate users' existing needs to select content.

It should further be noted that content 206 and content 208 may be available as options for initial and/or alternative content as a result of a cross-channel deep reinforcement learning using models with different goals, data, inputs, and/or training methodologies. For example, in one embodiment, content 206 and content 208 may result from a first and second machine learning model, respectively, which is a component of agent 204. Content 206 may result from the first machine learning model, the goal of which, is to predict new content that a user is unaware of (e.g., market a new product). Content 208 may result from the second machine learning model, the goal of which, is to predict a current intent of a user (e.g., service an existing need of the user). The output of the first machine learning model and the second machine learning model may include content for display as well as a content value indicator. For example, the first and second machine learning model may both indicate content to display to a user for respective goals as well as provide a quantitative or qualitative metric for how well that content meets the respective goal.

For example, the metric may comprise a confidence level of the likelihood that the predicted content meets the goal of the respective machine learning model. If the system determines that a first metric (e.g., for the first machine learning model) is higher than a second metric (e.g., for the second machine learning model), the system may select content 206 for display in user interface 210 as content 206 better meets the goal of its respective machine learning model. Alternatively, or additionally, system 200 may weigh this metric using one or more other factors to determine which content to display. Factors may include a confidence level (e.g., accuracy), a diversity metric (e.g., ensuring the same content and/or related content is not shown with a particular frequency), etc. For example, the system may alternate between content from the first machine learning model and the second machine learning model, unless a respective metric is above a threshold metric (e.g., indicating a high likelihood of the content meeting the goal).

For example, system 200 may use a set of per-task (e.g., per content impression) present value (e.g., as assigned by a content provider and/or third-party) that dynamically estimates the value of content 206 and content 208, current events (e.g., user clickstream data), and/or other time-bound measures to update its predictions (e.g., as described in FIG. 4 below). For example, content 206 may represent marketing content (e.g., a goal of the first machine learning model may be to increase product marketing). Accordingly, the goal of the first machine learning model may correspond to determining a potential new need for a user that is not known to the user (e.g., a new product that the user could use). For example, the first machine learning model may need to predict users' new behavior in response to a given content (e.g., whether or not the user will select the advertised content for purchase).

In contrast, content 208 may represent servicing content (e.g., a goal of the second machine learning model may be to increase product servicing). Accordingly, the goal of the first machine learning model may correspond to determining a current intent of a user (e.g., a user intends to report credit card fraud, a user intents to apply for a new credit card, a user intends to pay a credit card bill). For example, the second machine learning model may need to disambiguate users' existing needs (e.g., what existing service the user wishes to use).

The first and second machine learning model may need to be trained and updated separately. For example, labeled data for training a first machine learning model (e.g., user feature inputs that indicate users' new behavior in response to a given content) may not be available for new products and/or campaigns (which continuously emerge), the marketing of which, is the goal of the first machine learning model. In contrast, labeled data for training a second machine learning model (e.g., user feature inputs that when disambiguated indicated a users' existing needs) may be known and unchanging (or changing at a different rate and therefore requiring less updating). For example, in some embodiments, labels used to train the first machine learning model are updatable without updating labels used to train the second machine learning model.

Figure 3:
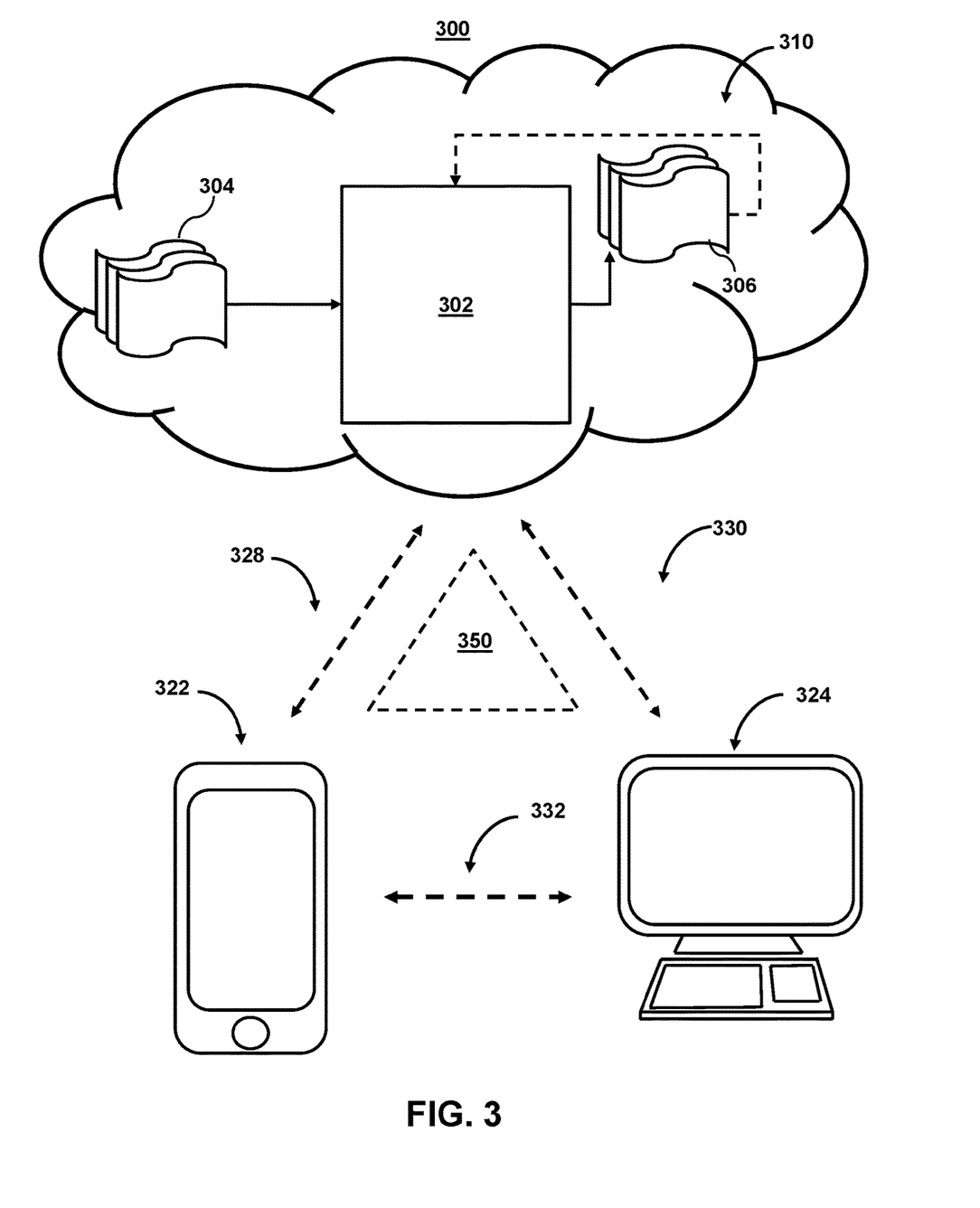
FIG. 3 is an illustrative system for dynamically selecting alternative content based on real-time events during device sessions through the use of a cross-channel, time-bound deep reinforcement machine learning, in accordance with one or more embodiments.

FIG. 3 is an illustrative system for dynamically selecting alternative content based on real-time events during device sessions through the use of a cross-channel, time-bound deep reinforcement machine learning, in accordance with one or more embodiments. For example, system 300 may represent the components used for dynamically selecting alternative content, as shown in FIGS. 1-2 and using a machine learning model. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to runs processes to determine alternative content. Cloud components 310 may also include cloud-based input/output circuitry configured to display alternative content.

Cloud components 310 may include model 302, which may be a machine learning model (e.g., as described in FIG. 2). For example, model 302 may a comprise a trained reinforcement learning agent, wherein the reinforcement learning agent is trained generate policy parameters, based on actions, observations, and returned values, which maximize the returned values in an environment, and wherein the environment is based on outputs from a first machine learning model, wherein the first machine learning model is trained to determine users' behavior in response to given content and outputs from a second machine learning model, wherein the second machine learning model is trained to disambiguate users' existing needs to select content.

Model 302 may take inputs 304 and provide outputs 306. The inputs may include multiple datasets such as a training dataset and a test dataset. Each of the plurality of datasets (e.g., inputs 304) may include data subsets related to user data, original content, and/or alternative content. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known alternative content for the first labeled feature input. The system may then train the first machine learning model to classify the first labeled feature input with the known alternative content.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302 and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., alternative content).

Model 302 may be trained on one or more datasets of information. For example, the system may utilize historical offline, synthetic online, and experimental online data sets. Historical offline data may be initial data from historical sessions with combined user response data (e.g., session clicks) having different determined and/or presumed goals. This data may be labeled with a determined goal and/or have associated features and timestamps. Historical data may be updated in real-time. Synthetic online data may be needed to account for leading effects when a user's responses change due to a system behavior change. These datasets may be used to train the initial model for production deployment. The production live model may continuously self-learn and self-evolve. For example, model 302 may have states that are logged for monitoring, adjusting and re-starting (if needed). Synthetic online data may include historical data that shows users' responses to the system's suggested alternative content. With new iterations of the system and/or model 302, users' responses may change (leading effect). For this reason, a set of synthetic online data may be needed, especially for an initial version. This data set may be created using a group of volunteers interacting with the model for a window of time. Finally, the system may use experimental online data. This dataset may apply to data for/from model 302 over a period of actual usage.

In some embodiments, model 302 may predict alternative content. For example, the system may determine that particular user data and/or previous user actions are more likely to be indicative of a desired or intent for a particular piece of alternative content. In some embodiments, the model (e.g., model 302) may automatically perform actions based on output 306. In some embodiments, the model (e.g., model 302) may not perform any actions on a user's account.

System 300 also includes an orchestration layer. The orchestration layer may include connections/instructions between components of system 300 (e.g., a reinforcement learning agent and machine learning models) and/or system 300 and/or one or more third-party applications. The orchestration layer may determine content to display (e.g., in user interface 100 (FIG. 1)) as well as provide data formatting between separate services, where requests and responses need to be split, merged or routed.

The orchestration layer may comprise API layer 350. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside, in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use developer portal. API layer 350 may use strong security constraints applying WAF and DDoS protection, and API layer 350 may use RESTful APIs as standard for external integration.

Figure 4:
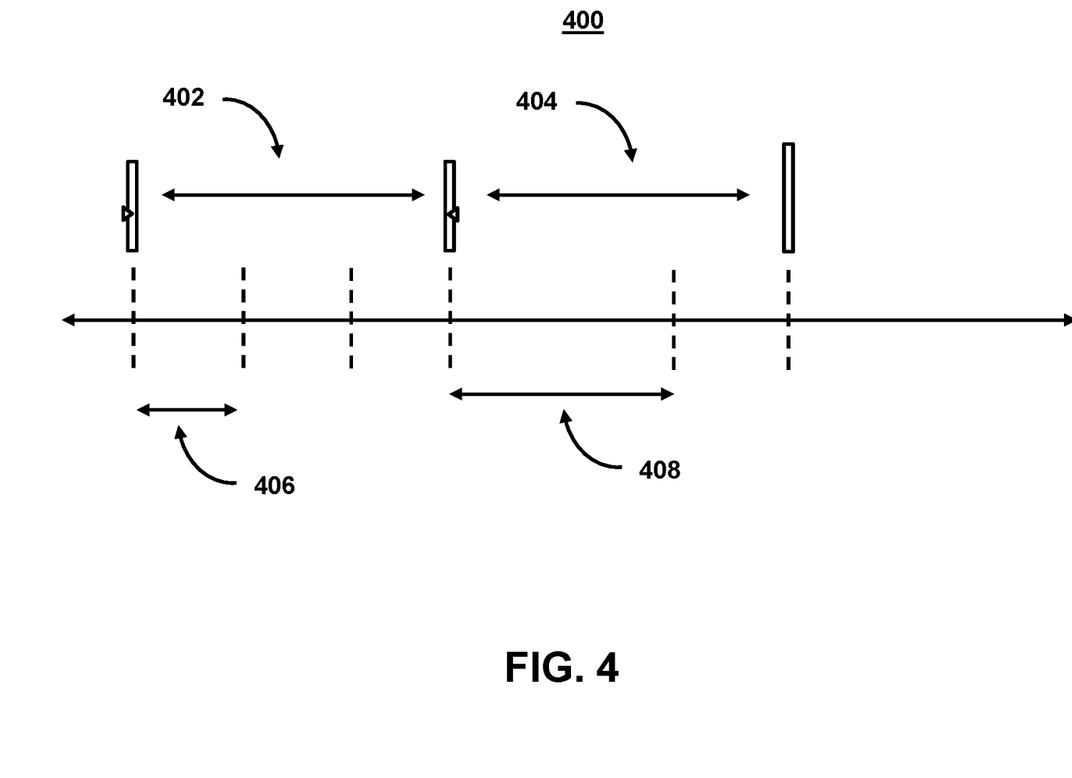
FIG. 4 shows an illustrative timeline for dynamically selecting alternative content based on real-time events during device sessions, in accordance with one or more embodiments.

FIG. 4 shows an illustrative timeline for dynamically selecting alternative content based on real-time events during device sessions, in accordance with one or more embodiments. For example, FIG. 4 shows timeline 400, which may correspond to a device session. The device session may comprise a plurality of time intervals (e.g., time interval 402 and time interval 404). Time interval 402 and time interval 404 may corresponds to time intervals at which the system generates alternative content. Time interval 402 and time interval 404 may also correspond to time windows during which the system monitors for new events.

For example, the system may monitor for event time steps (e.g., event time step 406 and event time step 408). Event time steps may comprise a time (which may be a portion of a time interval at which an event was received). Each event time step may have a different length and/or may correspond to a different event (or lack of an event). For example, as shown in FIG. 4, the system may detect three events during time interval 402 (e.g., corresponding to three event time steps). For example, the system may use discrete steps to synchronize continuous time and events. Each time window may allow time for a user to process presented alternative content (e.g., response to the content by selecting and/or otherwise engaging with the content). If the end of a time window is reached, the system may record any events (or the lack thereof) and update user data (e.g., user data 202) based on the recorded events. The end of a first time interval (e.g., time interval 402) may correspond to the beginning of a second time interval (e.g., time interval 404).

The event time steps may also correspond to an action and response cycle of the reinforcement learning agent (e.g., agent 204 (FIG. 2)). For example, an action (e.g., generated content shown in user interface 100 (FIG. 1) may be presented by the agent at the beginning of time interval 402 (and/or the beginning of event time step 406). The agent may then receive responses (e.g., returned values in the reinforcement learning environment of the system) at the end of each event time step. The system may then update the agent and/or model used for the agent during the remaining time interval (e.g., time interval 402). The agent may then send a new action (e.g., new alternative content) at the beginning of time interval 404.

For example, "actions" may be the agent's prediction of the best task (e.g., content) to present. For each action, the agent may collect an algorithmically determined returned value via returned value function. The actions and returned values may comprise streaming data combing the outputs of multiple machine learning models. This combination allows the cross-channel interaction learning, even though the multiple machine learning model may have different algorithms, architecture, training data, and/or goals.

During each time interval, the agent may receive a plurality of different events from a plurality of sources that may be synchronous or asynchronous (e.g., account data updates, stream data arrivals, suggested content timeouts, unchanged/unused data timeouts, etc.). The system may then collect this data and use it to generate new predictions. For example, the system may detect an event during a first time interval (e.g., time interval 402) and generate, prior to a second time interval of the plurality of time intervals, modified user data based on the event and the initial user data.

In some embodiments, the system may apply criteria before the agent pushes new content (e.g., for display in a user interface). For example, the system (and/or agent) may accumulate (e.g., at an orchestration layer) data arrival events. The system (e.g., via the agent and/or orchestration layer) may then, at a regular time step interval, determine if a new event has sufficiently triggered the agent's prediction. If so, the agent determines new content to present (e.g., with an average prediction latency under 150 microseconds).

Figure 5:
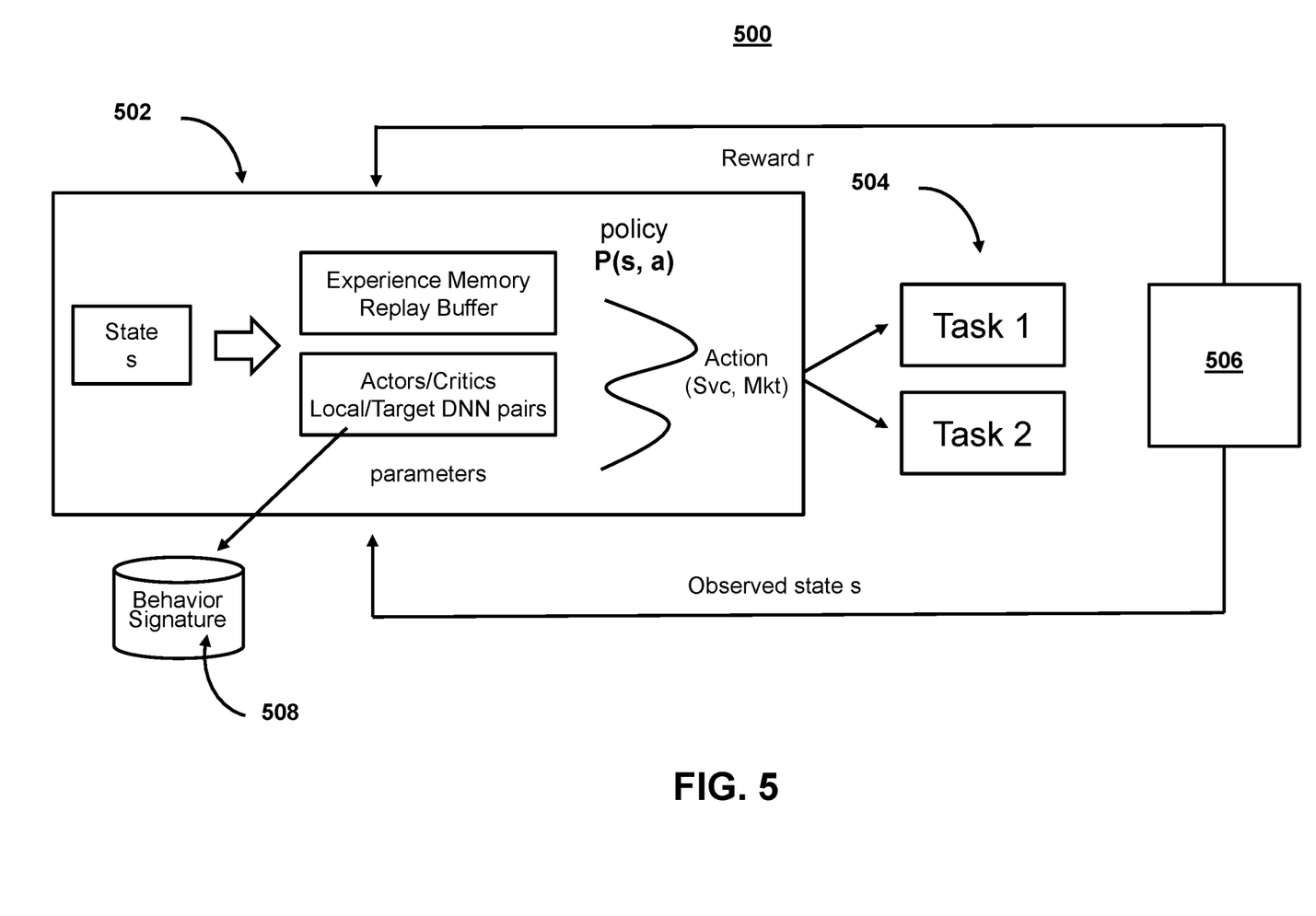
FIG. 5 shows an illustrative system for dynamically selecting alternative content based on real-time events during device sessions through the use of a cross-channel, time-bound deep reinforcement machine learning with a DDPG architecture, in accordance with one or more embodiments.

FIG. 5 shows an illustrative system for dynamically selecting alternative content based on real-time events during device sessions through the use of a cross-channel, time-bound deep reinforcement machine learning, in accordance with one or more embodiments. For example, system 500 shows a reinforcement learning DDPG built upon multiple machine learning models. In some embodiments, system 500 shows a reinforcement learning agent, wherein the reinforcement learning agent is trained generate policy parameters, based on actions, observations, and returned values, which maximize the returned values in an environment, and wherein the environment is based on: outputs from a first machine learning model, wherein the first machine learning model is trained to determine users' behavior in response to given content and outputs from a second machine learning model, wherein the second machine learning model is trained to disambiguate users' existing needs to select content.

For example, system 500 includes agent 502. The DDPG architecture may further include machine learning models 504 (e.g., structured as tasks from agent 502). Machine learning models 504 may output to environment 506. As shown in FIG. 5, the differences in users' responses are represented by the parameters of the neural networks inside agent 502. These neural networks may consist of a few fully connected layers. Due to the structure of system 500, different from other neural networks used for complex tasks (e.g. classification), these neural networks may be much simpler with the purpose of approximating policy probability distribution computation. As these neural networks are much similar, they do not present a stiff computational burden, thus allowing system 500 to provide predictions in under 150 microseconds.

Agent 502 may be trained to generate policy parameters, based on actions, observations, and returned values, which maximize the returned values in environment 506. The policy parameters may comprise parameter values, which at any time, may represent accumulated learning experience of agent 502 up to that point. The policy parameters may be stored in a behavior signature database 508. In some embodiments, the behavior signature database may allow system 500 to statistically reenact a user's response.

Environment 506 may comprise a task or simulation, and agent 502 may be a machine learning algorithm or model that interacts with the environment and tries to solve it. In FIG. 5, the environment is the task of deciding between tasks (e.g., outputs of machine learning models 504), and the goal of agent 502 is to solve this task by taking optimal actions, which are determined based on returned values and observations For example, agent 502 may take actions and receive observations from environment 506 that comprises a returned value for its action and information of its new state. The returned value information informs agent 502 how good or bad the action was, and the observation tells it what its next state in environment 506.

Depending on the learning algorithm, agent 502 may maintain one or more parameterized function approximators for training the policy. The approximators can be used as critics (e.g., for a given observation and action, a critic returns as output the expected value of the cumulative long-term returned value for the task) or actors (e.g., for a given observation, an actor returns as output the action that maximizes the expected cumulative long-term returned value). Agent 502 may use only critics to select its actions if relying on an indirect policy representation. Agent 502 may use only actors to select its actions if relying on a direct policy representation and may be referred to as policy-based. The policy can be either deterministic or stochastic. In general, this structure is simpler and can handle continuous action spaces, though the training algorithm may be sensitive to noisy measurements and may converge on local minima. In some embodiments, system 500 may perform a normalization to reduce noise.

System 500 estimates, for a given state "s," the probability distribution over actions "a". The system may then determine the best alternative content by determining the largest expected path-discounted total returned value. To fairly represent the needs of multiple goals, system 500 may select a stochastic policy over max-Q alternative architecture. For example, the system may train an agent to complete a task within this environment by receiving observations and returned values and sending actions to the environment.

Agent 502 may also use both an actor and a critic (e.g., an actor-critic agent). If so, during training, the actor learns the best action to take using feedback from the critic (instead of using the returned value directly). At the same time, the critic learns the value function from the returned values so that it can properly criticize the actor. In general, this structure can handle both discrete and continuous action spaces. In some embodiments, behavior signature database 508 may be kept as part of an enterprise-wide user database. System 500 may then generate experimental strategy designs for advertising, servicing and other tasks by accessing behavior signature database 508

Figure 6:
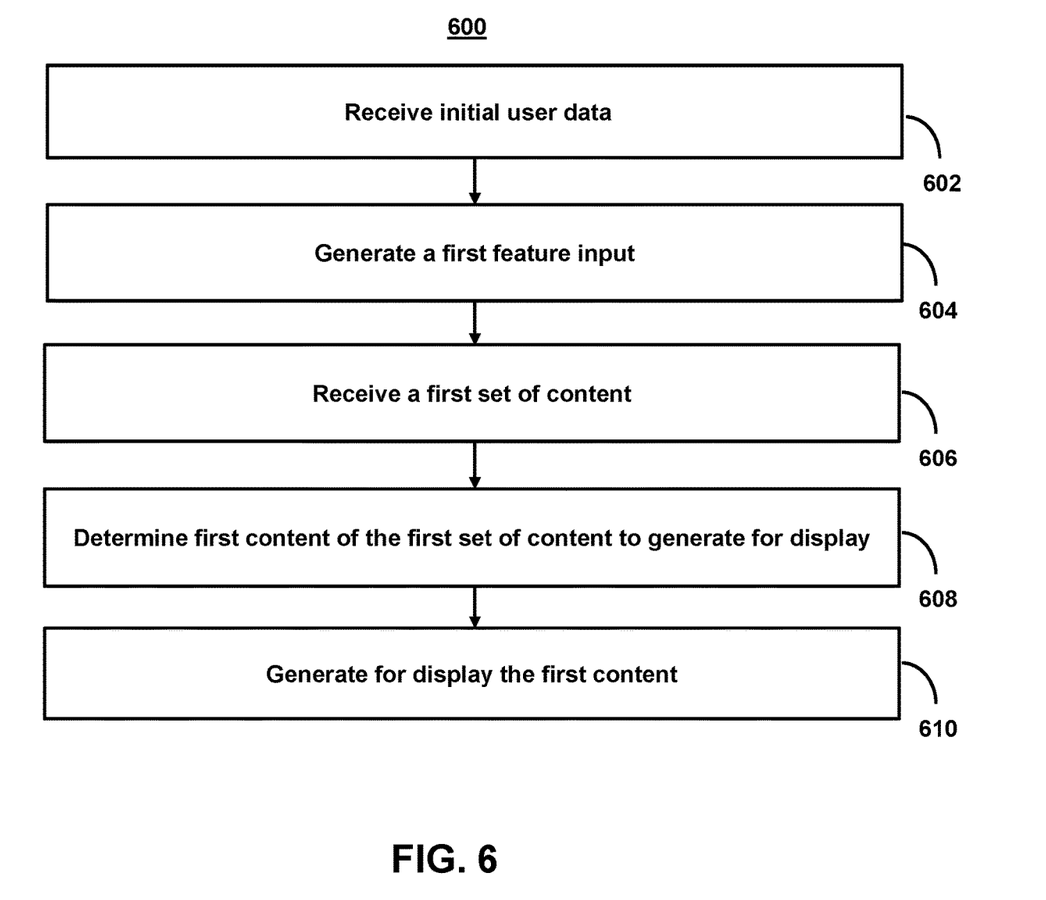
FIG. 6 shows a flowchart of the steps involved in dynamically selecting alternative content based on real-time events during device sessions through the use of a cross-channel, time-bound deep reinforcement machine learning, in accordance with one or more embodiments.

FIG. 6 shows a flowchart of the steps involved in dynamically selecting alternative content based on real-time events during device sessions through the use of a cross-channel, time-bound deep reinforcement machine learning with a DDPG architecture, in accordance with one or more embodiments. For example, process 600 may represent the steps taken by one or more devices as shown in FIGS. 1-3.

At step 602, process 600 (e.g., using one or more components in system 300 (FIG. 3)) receives initial user data. For example, the system may receive initial user data in response to a user initiating a device session, wherein the device session comprises a plurality of time intervals.

At step 604, process 600 (e.g., using one or more components in system 300 (FIG. 3)) generates a first feature input. For example, the system may generate a first feature input for a first machine learning model and a second machine learning model based on the initial user data. In some embodiments, the first machine learning model is trained to determine users' behavior in response to given content, and wherein the second machine learning model is trained to disambiguate users' existing needs to select content. Additionally or alternatively, labels used to train the first machine learning model are updatable without updating labels used to train the second machine learning model. Additionally or alternatively, the first machine learning model and the second machine learning model are trained separately on different training data.

At step 606, process 600 (e.g., using one or more components in system 300 (FIG. 3)) receives a first set of content. For example, the system may receive a first set of content from the first machine learning model and the second machine learning model based on the first feature input.

At step 608, process 600 (e.g., using one or more components in system 300 (FIG. 3)) determines first content of the first set of content to generate for display. For example, the system may determine, based on policy parameters, first content of the first set of content to generate for display in a user interface during a first time interval of the plurality of time intervals, wherein the policy parameters are determined by a reinforcement learning agent based on actions, observations, and returned values, which maximize the returned values in an environment, and wherein the environment is based on outputs from the first machine learning model and outputs from the second machine learning model. In some embodiments, the reinforcement learning agent is located in an orchestration layer. In some embodiments, reinforcement learning agent uses a stochastic policy and/or comprises an artificial neural network.

At step 610, process 600 (e.g., using one or more components in system 300 (FIG. 3)) generates for display the first content. For example, the system may generate for display, in the user interface, the first content during the first time interval. In some embodiments, a time between receiving the initial user data in response to the user initiating the device session and generating for display the first content during the first time interval is under 150 microseconds. In some embodiments, generating for display, in the user interface, the first content during the first time interval comprises a data-push operation.

In some embodiments, the system may then generate for display subsequent content. For example, the system may detect an event during the first time interval. The system may generate, prior to a second time interval of the plurality of time intervals, modified user data based on the event and the initial user data. The system may generate a second feature input for first machine learning model and the second machine learning model based on the modified user data. The system may receive a second set of content from the first machine learning model and the second machine learning model based on the second feature input. The system may determine, based on the policy parameters, second content of the second set of content to generate for display in the user interface during a second time interval of the plurality of time intervals, wherein the second time interval is after the first time interval. The system may then generate for display, in the user interface, the second content during the second time interval.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one of more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: dynamically selecting alternative content based on real-time events during device sessions through the use of a cross-channel, time-bound deep reinforcement machine learning using a Deep Deterministic Policy Gradient ("DDPG") architecture featuring a reinforcement learning agent, wherein the reinforcement learning agent is trained generate policy parameters, based on actions, observations, and returned values, which maximize the returned values in an environment, and wherein the environment is based on: outputs from a first machine learning model, wherein the first machine learning model is trained to determine users' behavior in response to given content; and outputs from a second machine learning model, wherein the second machine learning model is trained to disambiguate users' existing needs to select content.

2. A method for dynamically selecting alternative content based on real-time events during device sessions through the use of a cross-channel, time-bound deep reinforcement machine learning, the method comprising: receiving initial user data in response to a user initiating a device session, wherein the device session comprises a plurality of time intervals; generating a first feature input for a first machine learning model and a second machine learning model based on the initial user data; receiving a first set of content from the first machine learning model and the second machine learning model based on the first feature input; determining, based on policy parameters, first content of the first set of content to generate for display in a user interface during a first time interval of the plurality of time intervals, wherein the policy parameters are determined by a reinforcement learning agent based on actions, observations, and returned values, which maximize the returned values in an environment, and wherein the environment is based on outputs from the first machine learning model and outputs from the second machine learning model; and generating for display, in the user interface, the first content during the first time interval.

3. The method of any one of the preceding embodiments, further comprising: detecting an event during the first time interval; generating, prior to a second time interval of the plurality of time intervals, modified user data based on the event and the initial user data; generating a second feature input for first machine learning model and the second machine learning model based on the modified user data; receiving a second set of content from the first machine learning model and the second machine learning model based on the second feature input; determining, based on the policy parameters, second content of the second set of content to generate for display in the user interface during a second time interval of the plurality of time intervals, wherein the second time interval is after the first time interval; and generating for display, in the user interface, the second content during the second time interval.

4. The method of any one of the preceding embodiments, wherein the reinforcement learning agent is located in an orchestration layer.

5. The method of any one of the preceding embodiments, wherein the first machine learning model is trained to determine users' behavior in response to given content, and wherein the second machine learning model is trained to disambiguate users' existing needs to select content.

6. The method of any one of the preceding embodiments, wherein labels used to train the first machine learning model are updatable without updating labels used to train the second machine learning model.

7. The method of any one of the preceding embodiments, wherein the first machine learning model and the second machine learning model are trained separately on different training data.

8. The method of any one of the preceding embodiments, wherein a time between receiving the initial user data in response to the user initiating the device session and generating for display the first content during the first time interval is under 150 microseconds.

9. The method of any one of the preceding embodiments, wherein generating for display, in the user interface, the first content during the first time interval comprises a data-push operation.

10. The method of any one of the preceding embodiments, wherein reinforcement learning agent uses a stochastic policy.

11. The method of any one of the preceding embodiments, wherein reinforcement learning agent comprises an artificial neural network.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

What is claimed is:

1. A system for dynamically selecting alternative content based on real-time events during device sessions using a cross-channel, time-bound deep reinforcement machine learning, the system comprising:
  cloud-based storage circuitry configured to store a reinforcement learning agent, wherein the reinforcement learning agent is trained using synthetic online data that includes historical data that shows users' responses to suggested alternative content to generate policy parameters, based on actions, observations, and returned values, which maximize the returned values in an environment, wherein the returned values are received in the environment at an end of each event time step, and wherein the environment is based on:
    outputs from a first machine learning model, wherein the first machine learning model is trained using a first set of data to determine users' behavior in response to given content; and
    outputs from a second machine learning model, wherein the second machine learning model is trained using a second set of data to disambiguate users' existing needs to select content, wherein the first machine learning model is adjusted at a different rate than the second machine learning model;
  cloud-based control circuitry configured to:
    receive initial user data in response to a user initiating a device session, wherein the device session comprises a plurality of time intervals;
    generate a first feature input for the first machine learning model and the second machine learning model based on the initial user data;
    receive a first set of content from the first machine learning model and the second machine learning model based on the first feature input;
    determine, based on the policy parameters, first content of the first set of content to generate for display in a user interface during a first time interval of the plurality of time intervals;
    detect an event during the first time interval, wherein the event corresponds to a time limit of the first time interval being reached without a user input, wherein any detected events are recorded and the initial user data is modified based on the detected events;
    generate, prior to a second time interval of the plurality of time intervals, modified user data based on the event and the initial user data;
    generate a second feature input for the first machine learning model and the second machine learning model based on the modified user data;
    receive a second set of content from the first machine learning model and the second machine learning model based on the second feature input; and
    determine, based on the policy parameters, second content of the second set of content to generate for display in the user interface during a second time interval of the plurality of time intervals, wherein the second time interval is after the first time interval; and
  cloud-based input/output circuitry configured to:
    generate for display, in the user interface, the first content during the first time interval; and
    generate for display, in the user interface, the second content during the second time interval.

2. A method for dynamically selecting alternative content based on real-time events during device sessions using a cross-channel, time-bound deep reinforcement machine learning, the method comprising:
  receiving, using control circuitry, initial user data in response to a user initiating a device session, wherein the device session comprises a plurality of time intervals;
  detecting an event during a first time interval, wherein the event corresponds to a time limit of the first time interval being reached without a user input;
  generating, using the control circuitry, a first feature input based on the initial user data and the event for a first machine learning model trained using a first set of data and a second machine learning model trained using a second set of data, wherein the first machine learning model is adjusted at a different rate than the second machine learning model;
  receiving, using the control circuitry, a first set of content from the first machine learning model and the second machine learning model based on the first feature input;
  determining, based on policy parameters, first content of the first set of content to generate for display in a user interface during the first time interval of the plurality of time intervals, wherein the policy parameters are determined by a reinforcement learning agent based on actions, observations, and returned values, which maximize the returned values in an environment, wherein the environment is based on outputs from the first machine learning model and outputs from the second machine learning model, and wherein the reinforcement learning agent received the returned values in the environment at an end of each event time step; and
  generating for display, in the user interface, the first content during the first time interval, wherein any detected events are recorded and the initial user data is modified based on the detected events after the first time interval to generate modified user data.

3. The method of claim 2, further comprising:
  generating a second feature input for the first machine learning model and the second machine learning model based on the modified user data;
  receiving a second set of content from the first machine learning model and the second machine learning model based on the second feature input;
  determining, based on the policy parameters, second content of the second set of content to generate for display in the user interface during a second time interval of the plurality of time intervals, wherein the second time interval is after the first time interval; and
  generating for display, in the user interface, the second content during the second time interval.

4. The method of claim 2, wherein the reinforcement learning agent is located in an orchestration layer.

5. The method of claim 2, wherein the first machine learning model is trained to determine users' behavior in response to given content, and wherein the second machine learning model is trained to disambiguate users' existing needs to select content.

6. The method of claim 2, wherein labels used to train the first machine learning model are updatable without updating labels used to train the second machine learning model.

7. The method of claim 2, wherein the first machine learning model and the second machine learning model are trained separately on different training data.

8. The method of claim 2, wherein a time between receiving the initial user data in response to the user initiating the device session and generating for display the first content during the first time interval is under 150 microseconds.

9. The method of claim 2, wherein generating for display, in the user interface, the first content during the first time interval comprises a data-push operation.

10. The method of claim 2, wherein the reinforcement learning agent uses a stochastic policy.

11. The method of claim 2, wherein the reinforcement learning agent comprises an artificial neural network.

12. A non-transitory, computer-readable medium for dynamically selecting alternative content based on real-time events during device sessions using a cross-channel, time-bound deep reinforcement machine learning, comprising instructions that, when executed by one or more processors, cause operations comprising:
receiving initial user data in response to a user initiating a device session, wherein the device session comprises a plurality of time intervals;
generating a first feature input for a first machine learning model and a second machine learning model based on the initial user data, wherein the first machine learning model is trained using a first set of data to predict new content to a user, and wherein the second machine learning model is trained using a second set of data to predict a current intent of the user, wherein the first machine learning model is adjusted at a different rate than the second machine learning model;
receiving a first set of content from the first machine learning model and the second machine learning model based on the first feature input, wherein the first set of content comprises first content generated by the first machine learning model and having a first metric indicating a first confidence for the new content and second content generated by the second machine learning model having a second metric indicating a second confidence of the current intent of the user;
determining, based on policy parameters, first content of the first set of content to generate for display in a user interface during a first time interval of the plurality of time intervals, wherein the policy parameters select the first content based on a comparison of the first confidence and the second confidence, wherein the policy parameters are determined by a reinforcement learning agent based on actions, observations, and returned values, which maximize the returned values in an environment, and wherein the environment is based on outputs from the first machine learning model and outputs from the second machine learning model; and
generating for display, in the user interface, the first content during the first time interval, wherein any detected events are recorded and the initial user data is modified based on the detected events after the first time interval to generate modified user data.

13. The non-transitory, computer-readable medium of claim 12, wherein the instructions further cause operations comprising:
detecting an event during the first time interval, wherein the event corresponds to a time limit of the first time interval being reached without a user input;
generating, prior to a second time interval of the plurality of time intervals, modified user data based on the event and the initial user data;
generating a second feature input for the first machine learning model and the second machine learning model based on the modified user data;
receiving a second set of content from the first machine learning model and the second machine learning model based on the second feature input;
determining, based on the policy parameters, second content of the second set of content to generate for display in the user interface during a second time interval of the plurality of time intervals, wherein the second time interval is after the first time interval; and
generating for display, in the user interface, the second content during the second time interval.

14. The non-transitory, computer-readable medium of claim 12, wherein the reinforcement learning agent is located in an orchestration layer.

15. The non-transitory, computer-readable medium of claim 12, wherein the first machine learning model is trained to determine users' behavior in response to given content, and wherein the second machine learning model is trained to disambiguate users' existing needs to select content.

16. The non-transitory, computer-readable medium of claim 12, wherein labels used to train the first machine learning model are updatable without updating labels used to train the second machine learning model.

17. The non-transitory, computer-readable medium of claim 12, wherein the first machine learning model and the second machine learning model are trained separately on different training data.

18. The non-transitory, computer-readable medium of claim 12, wherein a time between receiving the initial user data in response to the user initiating the device session and generating for display the first content during the first time interval is under 150 microseconds.

19. The non-transitory, computer-readable medium of claim 12, wherein generating for display, in the user interface, the first content during the first time interval comprises a data-push operation.

20. The non-transitory, computer-readable medium of claim 12, wherein reinforcement learning agent uses a stochastic policy or comprises an artificial neural network.

* * * * *